(12) United States Patent
Porat et al.

(10) Patent No.: US 7,331,004 B1
(45) Date of Patent: Feb. 12, 2008

(54) DATA STORAGE SYSTEM ANALYZER HAVING SELF RESET

(75) Inventors: Ofer Porat, Westborough, MA (US); Alexander Rabinovich, Acton, MA (US); Tony Phelan, Dorchester, MA (US)

(73) Assignee: EMC Corporation, Hopkinton, MA (US)

( * ) Notice: Subject to any disclaimer, the term of this patent is extended or adjusted under 35 U.S.C. 154(b) by 351 days.

(21) Appl. No.: 10/812,580

(22) Filed: Mar. 30, 2004

(51) Int. Cl.
*G01R 31/28* (2006.01)
*H04B 3/46* (2006.01)
*H03M 9/00* (2006.01)

(52) U.S. Cl. .................. 714/715; 375/224; 341/100

(58) Field of Classification Search ............ 714/715, 714/18
See application file for complete search history.

(56) References Cited

U.S. PATENT DOCUMENTS

| | | | |
|---|---|---|---|
| 5,623,507 A * | 4/1997 | Burns et al. ............ | 714/765 |
| 6,374,389 B1 * | 4/2002 | Tuma et al. ............ | 714/802 |
| 6,742,134 B1 * | 5/2004 | Pothier et al. .......... | 714/4 |
| 6,747,997 B1 * | 6/2004 | Susnow et al. .......... | 370/509 |
| 6,983,362 B1 * | 1/2006 | Kidder et al. .......... | 713/1 |
| 7,142,612 B2 * | 11/2006 | Horowitz et al. ........ | 375/286 |
| 2002/0147947 A1 * | 10/2002 | Mayweather et al. ..... | 714/704 |

* cited by examiner

Primary Examiner—Cynthia Britt

(57) ABSTRACT

A transmitter board transmits a copy of signals in a system being analyzed by the system analyzer. The copy of such signals comprises serial data in a low byte serial link and in a high byte serial link. The signals include special characters interspersed in a pattern with the data in the low and high byte serial links. An analyzer board includes a serializer-deserializer for receiving the transmitted serial data when the analyzer board is plugged into the transmitter board for converting the received data and the interspersed special characters in both the low and high byte serial links into corresponding data and interspersed special characters in low byte and high byte parallel links. A mismatch between the data and the interspersed pattern of special characters in the converted low byte parallel link and the pattern of special characters in the converted high byte parallel links resets the serializer-deserializer.

9 Claims, 12 Drawing Sheets

DATA STORAGE SYSTEM ANALYZER HAVING SELF RESET

TECHNICAL FIELD

This invention relates generally to data storage systems, and more particularly to systems and methods for analyzing content and protocol used in such data storage system during normal data system operation.

BACKGROUND

As is known in the art, large host computers and servers (collectively referred to herein as "host computer/servers") require large capacity data storage systems. These large computer/servers generally includes data processors, which perform many operations on data introduced to the host computer/server through peripherals including the data storage system. The results of these operations are output to peripherals, including the storage system.

One type of data storage system is a magnetic disk storage system. Here a bank of disk drives and the host computer/server are coupled together through an interface. The interface includes "front end" or host computer/server controllers (or directors) and "back-end" or disk controllers (or directors). The interface operates the controllers (or directors) in such a way that they are transparent to the host computer/server. That is, data is stored in, and retrieved from, the bank of disk drives in such a way that the host computer/server merely thinks it is operating with its own local disk drive. Thus, while the host computer server may transmit data in any one of a plurality of different protocols, the data is translated by a protocol translator in the interface to a common interface protocol. When data is retrieved from the disk drives by the interface using the system protocol, the data is then passed through the interface protocol translator so that the data is returned to the host computer/sever with the same protocol in which it was originally sent by the host computer/server to the interface. One such system is described in U.S. Pat. No. 5,206,939, entitled "System and Method for Disk Mapping and Data Retrieval", inventors Moshe Yanai, Natan Vishlitzky, Bruno Alterescu and Daniel Castel, issued Apr. 27, 1993, and assigned to the same assignee as the present invention and another is described in U.S. Pat. No. 6,631,433, entitled "Bus Arbiter for Data Storage System", inventor Paluzzi, issued Oct. 7, 2003 and assigned to the same assignee as the present invention, the entire subject matter thereof being incorporated herein by reference.

The host computer/server controllers, disk controllers and cache memory are interconnected through a backplane printed circuit board. More particularly, disk directors are mounted on disk director (referred to as back end director) printed circuit boards. The host computer/server directors are mounted on host computer/server director (referred to as front end director) printed circuit boards. And, cache memories are mounted on cache memory printed circuit boards. In the former system described in U.S. Pat. No. 5,206,939, the directors and the memory are interconnected through a multi-drop parallel bus, while in the later system, described in U.S. Pat. No. 6,631,433, the memory and the directors are connected with point-to-point serial bi-directional busses.

During development of such a data storage system, the data storage system manufacturer can replace one of the directors with a customized director which is configured to watch traffic on the set of buses and communicate that traffic to a logic analyzer. To this end, the manufacturer disconnects one of the director modules from the set of buses and connects the customized director to the set of buses in its place. The manufacturer then operates the logic analyzer while the data storage system is running in order to test and/or debug the operation of the data storage system. In particular, the manufacturer uses the customized director to monitor or "snoop" the set of buses, and uses the logic analyzer to analyze signals exchanged between the remaining directors and the memory. Accordingly, the manufacturer can determine whether the data storage system operates properly, and identify sources of problems if they exist.

Unfortunately, there are deficiencies to the above-described approach to testing and debugging a data storage system by disconnecting a director from a set of buses of the data storage system, and connecting a director (which leads to a logic analyzer) to the set of buses in its place. For example, the removal of the director means that the data storage system is no longer capable of generating maximum traffic. That is, the data storage system can no longer have a maximum configuration since the removed director is no longer available to perform work. Accordingly, the traffic monitored by the logic analyzer does not truly represent the traffic of a fully configured data storage system.

Additionally, the above-described approach may not be well-suited for monitoring data storage systems which use communication mechanisms that are not multi-drop buses. For example, the above-described approach may not be well-suited for a data storage system having modules that communicate through non-blocking, point-to-point channels because such a data storage system may not have a commonly shared communications medium (e.g., a multi-drop bus) from which to snoop or tap into. Rather, in such a data storage system, each module has a separate, or private, non-blocking point-to-point channel with another module. Accordingly, the above-described approach cannot connect to and snoop on a commonly shared communications medium.

One technique used for monitoring operation of a data storage system having a point-to-point bus arrangement operates by providing a copy of the signals passing through the point-to-point buses. Such technique is described in co-pending patent application entitled "System Analyzer for a Data Storage System", inventors Mark Zani, Ofer Porat and Alexander Rabinovich, Ser. No. 10/100,458, filed Mar. 18, 2002, assigned to the same assignee as the present invention, the entire subject matter thereof being incorporated herein by reference. There, while a first point-to-point signal is exchanged between the director and the memory, a second point-to-point signal is provided which is a copy of the first point-to-point signal. Use of the second point-to-point signal alleviates the need to tap into or snoop the first point-to-point signal.

While such analyzer operates effectively to monitor the operation of a system, the analyzer is connected to the system prior to system start-up. In some applications it would be desirable to plug the analyzer into an operating data storage system, that is, provide a hot-pluggable system analyzer. While the analyzer described above is hot-pluggable, errors developed in transferring signals to the analyzer requiring manual verification of the existence of a problem then, if there was an error, manually resetting the analyzer.

SUMMARY

In accordance with the invention, a system having a transmitter board for transmitting a copy of signals produced in such system. The copy of such signals comprises serial data in a low byte serial link and in a high byte serial link. The signals include special characters interspersed in a pattern with the data in the low and high byte serial links. A system analyzer board is provided. The system analyzer board includes a serializer-deserializer for receiving the transmitted serial data when the analyzer board is plugged into the transmitter board, and for converting the received data and the special characters interspersed in both the low and high byte serial links into corresponding data and the interspersed special characters in low byte and high byte parallel links. A logic is provided for determining mismatches between the data and the interspersed pattern of special characters in the converted low byte parallel link and the converted high byte parallel link and for producing a reset signal for the serializer-deserializer when a predetermined plurality of mismatches is determined.

In one embodiment, the logic maintains a count of the number of mismatches, such system providing a reset signal to the serializer-deserializer when a predetermined plurality of mismatches has been indicated.

In accordance with another feature of the invention, a system analyzer includes a transmitter board for transmitting a copy of signals being produced in a system for analysis by the system analyzer. The copy of such signals comprising serial data, each such data being in a series a low byte serial link and a high byte serial link. The signals include the data and special characters interspersed in a pattern with the data in the low byte serial link and interspersed with the data in such high byte serial link. An analyzer board is adapted for plugging into the transmitter board. The analyzer board includes a serializer-deserializer for receiving the transmitted serial data when the analyzer board is plugged into the transmitter board, and for converting the received data and the special characters interspersed therewith in the low byte serial link into corresponding a low byte parallel link and concurrently converting the received data and the special characters interspersed therewith in the high byte serial link into a corresponding high byte parallel link. A system is provided for determining whether the data and interspersed pattern of special characters in the converted low byte parallel link mismatch the data and the interspersed pattern of special characters in the converted high byte parallel link, a determined mismatch indicating the high byte parallel link is not aligned with the low byte parallel link, such system maintaining a count of the number of mismatches, such system providing a reset signal to the serializer-deserializer when a predetermined plurality of mismatches has been indicated.

In accordance with another feature of the invention, a system analyzer is provided having a transmitter board for transmitting a copy of signals being produced in a system for analysis by the system analyzer, the copy of such signals comprising serial data. Each such data in the series has lower significant bytes thereof in a low byte serial link and has more significant bytes thereof in a high byte serial link. The signals include with the data, special characters interspersed in a pattern with the bytes of each of the data in such low byte serial link and interspersed with the bytes of each of the data in such high byte link serial data. An analyzer board is adapted for plugging into the transmitter board. The analyzer board includes a serializer-deserializer for receiving the transmitted serial data when the analyzer board is plugged into the transmitter board, and for converting the received low significant bytes of each data and the special characters interspersed therewith in the low byte serial link into corresponding lower significant bytes in a parallel low byte link and concurrently converting the received higher significant bytes in each data and the special characters interspersed therewith in the high byte serial link into corresponding parallel higher significant bytes in a parallel high byte link. A system is provided for determining whether the data and pattern of special characters in the parallel low byte link matches the data and the pattern of special characters in the parallel high byte link, a determined match indicating the high byte parallel link is aligned with the low byte parallel link and a mismatch indicating the high byte parallel link is not aligned with the low byte parallel link, such system maintaining a count of the number of mismatches, such system providing a reset signal when a predetermined plurality of mismatches has been indicated. The reset signal is fed to the serializer-deserializer to reset such serializer-deserializer.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
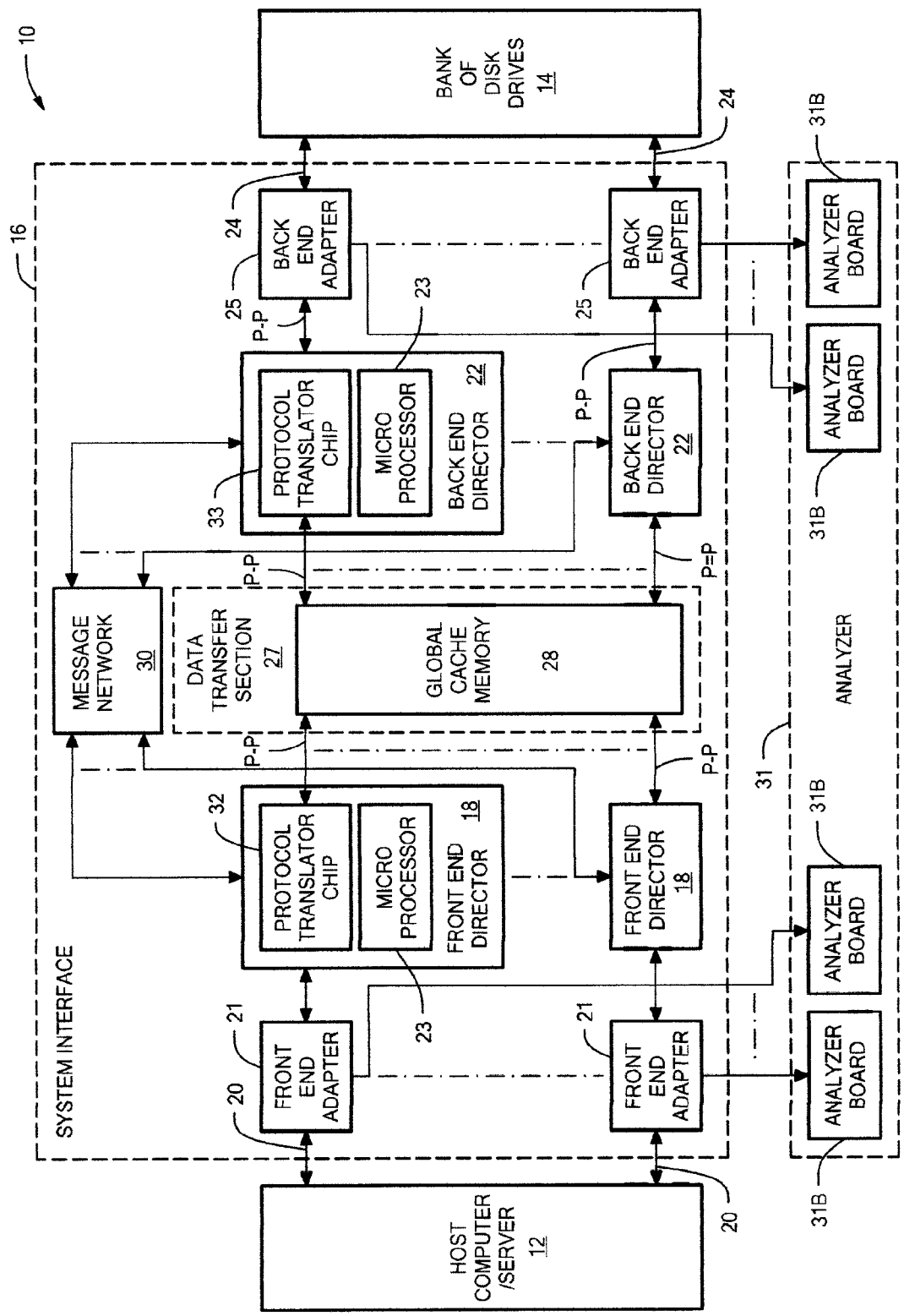
FIG. 1 is a block diagram of a data storage system according to the invention.

Referring now to FIG. 1, a data storage system 10 is shown for transferring data between a host computer/server 12 and a bank of disk drives 14 through a system interface 16. The system interface 16 includes: a plurality of front-end directors 18 coupled to the host computer/server 12 via ports 20 though a plurality of front end adapters 21; a plurality of back-end directors 22 coupled to the bank of disk drives 14 via ports 24 though back end adapters 25; a data transfer section 27 having a global cache memory 28, coupled to the plurality of front-end directors 18 and the back-end directors 22; and a messaging network 30, operative independently of the data transfer section 26 and coupled to the plurality of front-end directors 18 and to the plurality of back-end directors 22, as shown.

As described in more detail in the above-referenced U.S. Pat. No. 6,631,433, the front-end and back-end directors 18, 22 are functionally similar and include a microprocessor 23, a message engine/CPU controller, not shown, and a data pipe, not shown. Suffice it to say here, however, that the front-end and back-end directors 18, 22 control data transfer between the host computer/server 12 and the bank of disk drives 14 in response to messages passing between the directors 18, 22 through the messaging network 30. The messages facilitate the data transfer between host computer/server 12 and the bank of disk drives 14 with such data passing through the global cache memory 28 via the data transfer section 26.

It is noted that there are separate point-to-point data paths P-P between each one of the directors 18, 22 and the global cache memory 28. The front end and back end adapters 21, 25 provide signal conditioning (including re-timing) to the signal passing between the host computer/server 12 and front end directors 24, bank of disk drives 14 and back end directors 22, respectively.

Also included is a system analyzer 31 to monitor operation of the data system 10.

Figure 2:
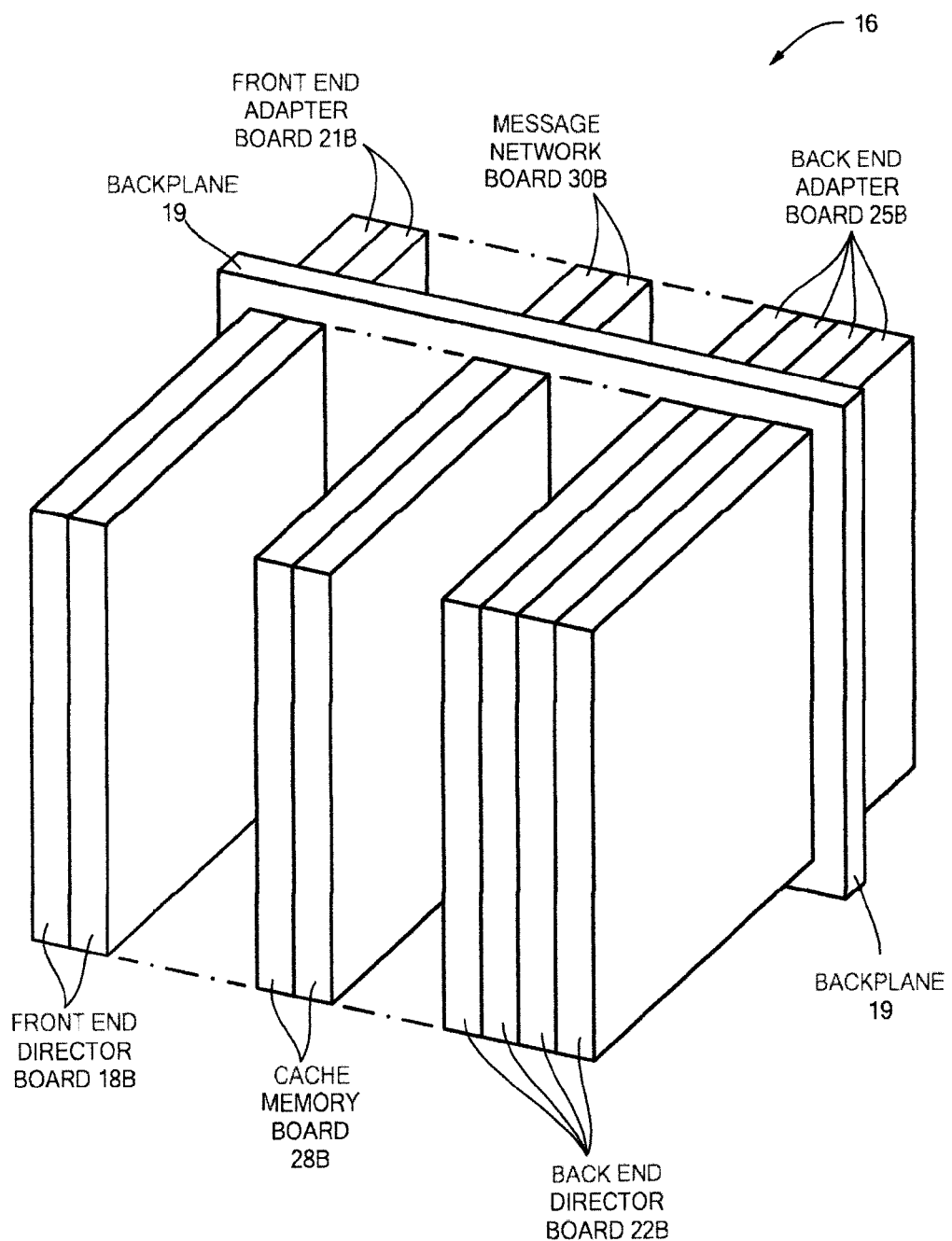
FIG. 2 is a diagram showing an interface having front end director boards, back end director boards, front end adapted boards, back end adapter boards, memory boards, message network boards used in the system of FIG. 1 and interconnected though a backplane and connected to an analyzer having analyzer boards.
Figure 3:
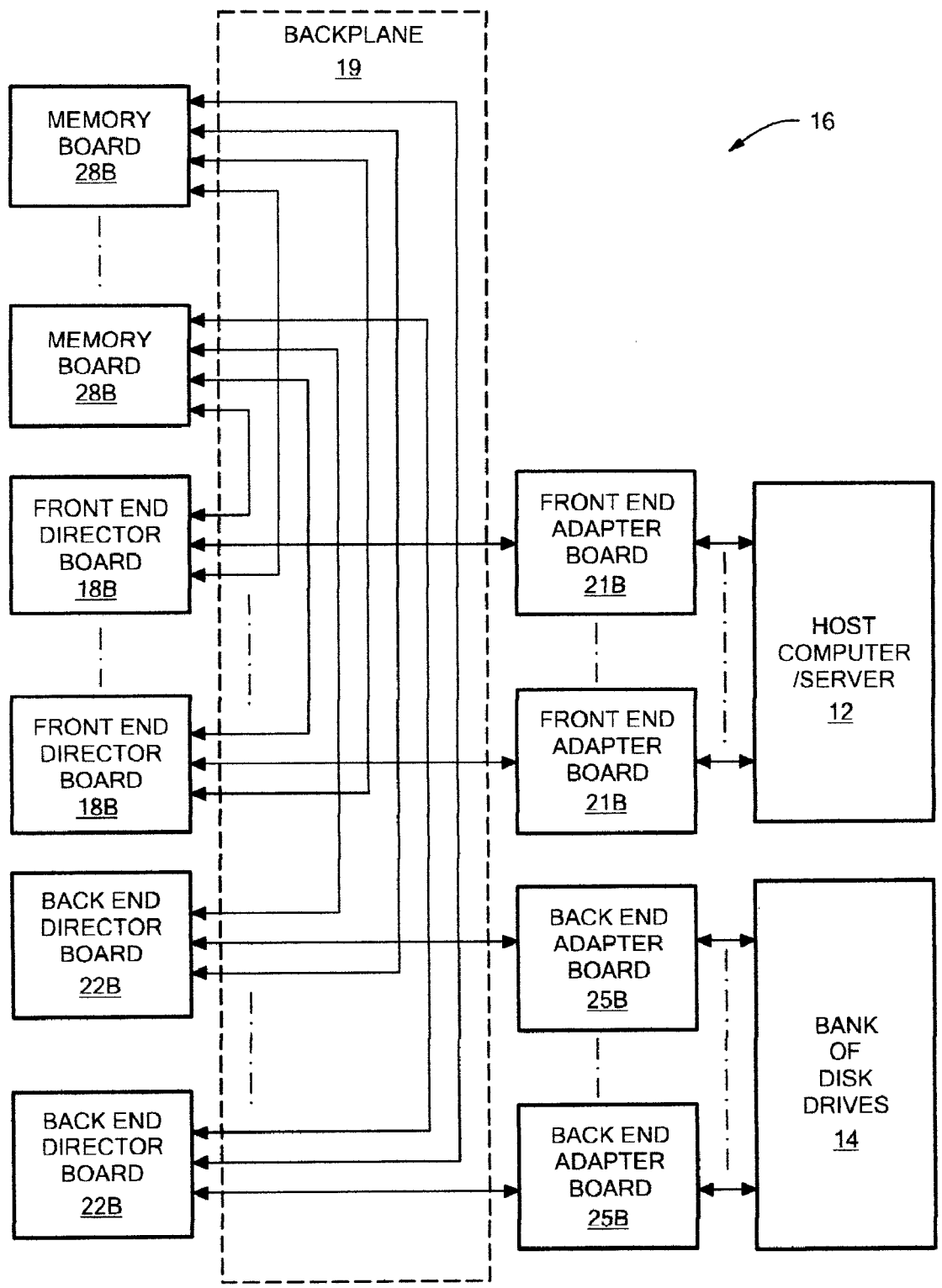
FIG. 3 is a diagram showing the interface, host computer/server and bank of disk drives.

More particularly, referring now also to FIGS. 2 and 3, the connections between the host computer/server 12, bank of disk drives 14, front end director boards 18B, back end director boards 22B, front end adapter boards 21B, back end adapter boards 25B and global cache memory 28 of interface 16 are shown. The system interface 16 is shown to include: the plurality of, front-end director boards 18B, each one having here four of the front-end directors 18, plugged into a first surface of a backplane 19; the plurality of back-end director boards 22B, each one having here four of the front-end directors 22, plugged into the first surface of the backplane 19; and a plurality of memory boards 28B which together make up the global cache memory 28 plugged into the first surface of the backplane 19.

The interface 16 also includes the plurality of front-end adapted boards 21B, each one having here four of the front-end adapters 21, plugged into a second, opposite surface of the backplane 19. It is noted that each one of the front-end adapted boards 21B is mounted behind the corresponding one of the front-end directors boards 18B it is connected to.

The interface 16 also includes the plurality of back end adapted boards 25B, each one having here four of the back end adapters 25, plugged into the second, opposite surface of the backplane 19. It is noted that each one of the back end adapted boards 25B is mounted behind the corresponding one of the back end director boards 2B it is connected to.

It is noted that the message network boards 30B making up the message network 30 (FIG. 1) are plugged into the second side of the backplane 19 behind the memory boards 26B as described above in the above referenced U.S. Pat. No. 6,631,433.

The connections between the directors 16, 22 on the director boards 16B, 2B and the memory 28 on the memory boards 28B is though conductors of the backplane 19, as shown in FIG. 3. Further, the connections between the directors 16, 22 on the director boards 16B, 22B and the adapters 21, 25 on the adapter boards 21B, 25B are also through conductors of the backplane 19. It is also noted that the backplane 19 is a passive backplane because it is made up of only etched conductors on one or more layers of a printed circuit board. That is, the backplane 19 does not have any active components.

It is noted that each memory board 28B is connected to all front-end directory boards 28B and all back-end director boards 22B with a point-to-point, bi-directional serial bus. Thus, for example, with an interface 16 having eight memory boards 28B, eight front-end director boards 18B and eight back end director boards 22B, there are sixteen channels for each memory board 18B. Each director board 18B, 22B has eight channels, one channel for such director board 18B, 22B and the eight memory boards 28B connected to it. Thus, for any one director board 18B, 22B there are provided eight copies data between such director board 18B, 22B and each of the eight memory boards 28B connected to it. Thus, each adapter board 21B, 25B has eight copies of the signals passing between the one of the director boards connected to such adapter board and the eight memory boards connected to such one of the director boards. Each one of these eight copies is provided to the adapter board on a corresponding one of eight redundant channels.

Figure 4:
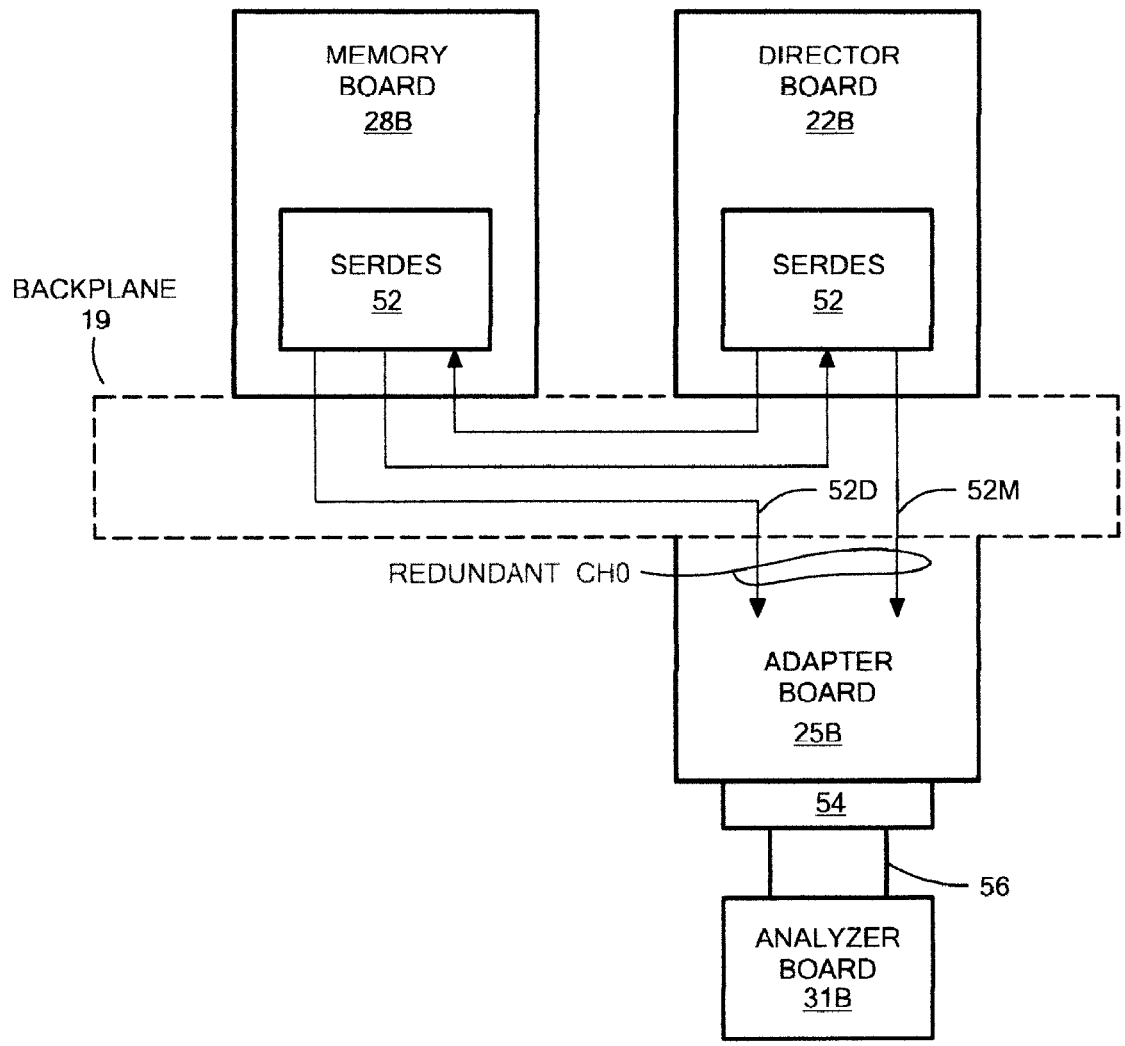
FIG. 4 shows connections between an exemplary one of the memory boards, an exemplary one of the adapter boards, an exemplary one of the director boards and an exemplary one of the analyzer boards.

More particularly, referring to FIG. 4, the connections are shown between an exemplary one of the memory boards 28B and an exemplary one of the director boards 18B, 22B, here a back end director board 22B and the back end adapter board 25B connected to such exemplary back end director board 22B through a primary bi-directional channel 52 of the backplane 19. Thus, the primary channel, here CH_0 includes a pair of buses or serial links, which together make up primary channel 52.

Figure 5:
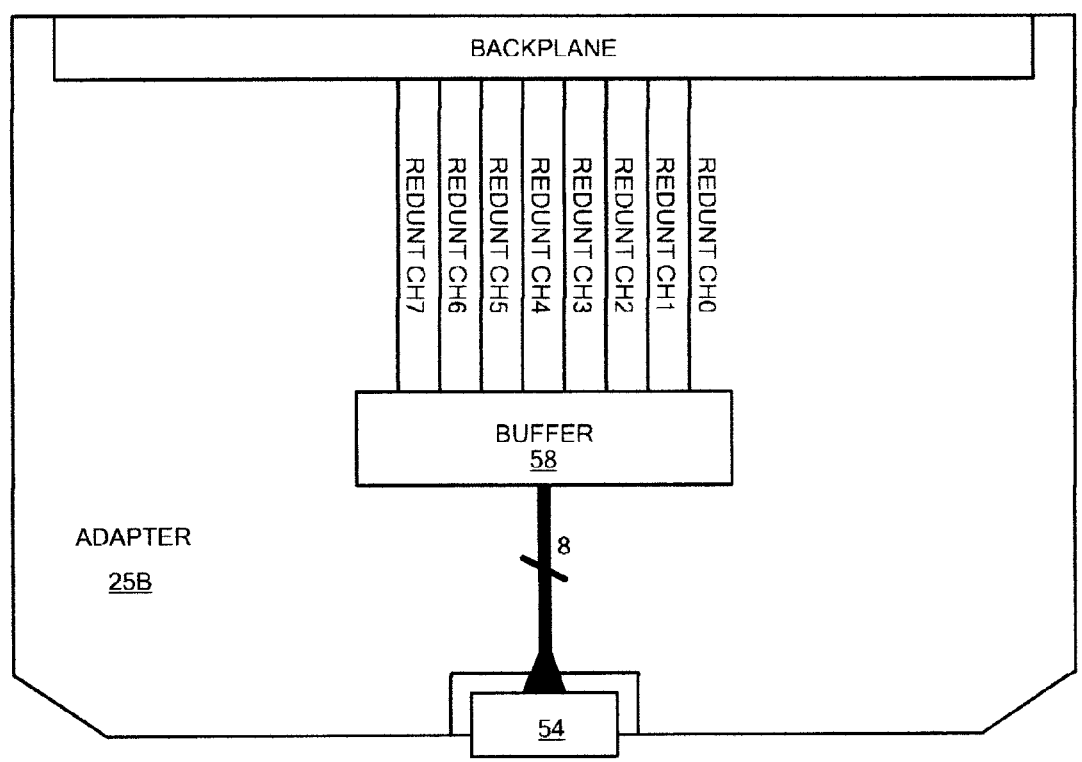
FIG. 5 is a diagram of an exemplary one of the adapter boards of FIG. 4.

A copy of the signal in primary channel CH_0 from a serializer/de-serializer (SERDES) in the director board 22B to a SERDES in the memory board 28B is fed by uni-directional serial bus, or serial link 52D to the adapter board 25B connected to the director board 22B. Likewise, a copy of the signal from a serializer/de-serializer (SERDES) in the memory board 28B to a SERDES in the director board 28B is fed by uni-directional serial bus, or link 52M to the adapter board 25B connected to the directory board 22B. The buses 52M, 52D make up a redundant channel CH, here REDUNDANT CH_0. Thus, in this example there are eight redundant channels, REDUNDANT_CH0 through REDUNDANT_CH07, as shown in FIG. 5 for an exemplary of one the adapter boards 25B which plugs into the backplane 19 via backplane connector 54 and which plugs into the analyzer 31 via analyzer connector 56 through a buffer 58, as shown in FIG. 6.

Figure 6:
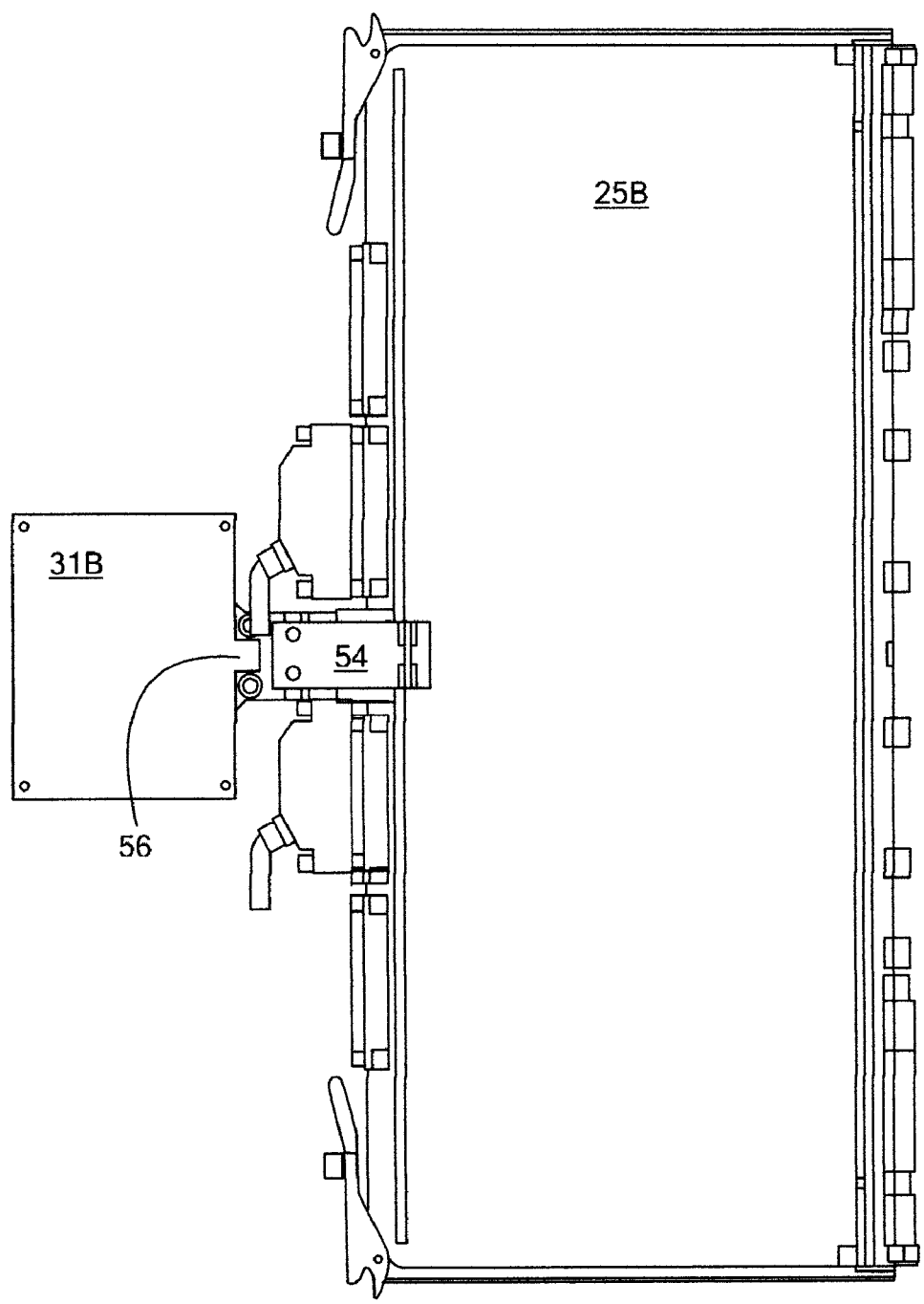
FIG. 6 is a drawing showing an exemplary one of the adapter boards connected to an exemplary one of the analyzer boards of FIG. 4.

More particularly, the analyzer 31 includes a plurality of analyzers boards 31B, each one plugs into a corresponding one of though adapter boards 21B, 25B, as shown for an exemplary of the adapter boards, here back end adapter board 25B and its corresponding analyzer board 31B in FIG. 6, Thus, as noted above, the memory boards 28B and director boards 18B, 22B are connected by serial links 52 (FIG. 4). Each channel is made up of 2 full duplex serial links (i.e., a high byte serial link for the most significant bits and a low byte serial link) for the least significant bits, for extra bandwidth. Thus, the signals on each one of the eight redundant channels are on four lines, two serial links (i.e., a high byte serial link and a low byte serial link) for signals from the memory, (i.e., a memory-to-director portion) which make up each of the pair of lines for bus 52M, and two serial links (i.e., a high byte serial link and a low byte serial link) for signals from the director, (i.e., a memory-to-director portion) which make up each of the pair of lines for bus 52D.

To monitor the data on those links, redundant ports are used to bring out a copy of the data via lines 52D, 52M (FIG. 4) to the adapter board 25B to make it accessible to the analyzer 31, and more particularly to the one of the analyzer board 31B connected to the director board 22B. Thus, there are 32 lines from each one of the adapter boards 21B, 25B, four lines for each of the eight redundant channels, REDUNDANT_CH0 through REDUNDANT_CH07, each channel having a pair of lines for the high and low links of signals from the memory board 28B connected to it, and a pair of lines for the high and low links of signals from director board 18B, 22B connected to it.

All adapter boards 21B, 25B are designed to function with the system analyzer board 31B and contain circuitry 58 (FIG. 5) to amplify the redundant signals coming from the backplane 19 on redundant channels REDUNDANT_CH_0 through REDUNDANT_CH07. The amplified signals are brought out by the external connector 54 (FIG. 6). It is to this connector 56 that the analyzer board 31B is connected as shown in FIG. 6.

The protocol used by the interface 16, FIG. 3, is based on the 8B/10B serial transmission standard. According to the 8B/10B standard 8-bit characters are converted to specially encoded 10-bit characters which are then transmitted over the serial link. The purpose of 8B/10B is to improve serial link operation and allow convenient error detection. In addition to having an equivalent for all 256 possible 8-bit characters the 10B set also includes special timing characters (semaphores) used for signaling links states and receiver synchronization. More particularly, the protocol uses the 8B/10B semaphores directly or in combination with other characters to indicate the mode in which the link is operating (Resynchronization, Ready, Busy, Not Operational) and to mark the beginning, middle, and end of data frames. When data is sent over the channel it is split across the 2 serial links that make up that channel so that half goes on the high link (for, as noted above, the most significant bits) and half goes on the low link (for, as noted above, the least significant bits). Unlike data, which can have different values on the high and low links (but both links must be sending data), identical semaphores must occur on both links at the same time to make sure that the links frames are properly aligned.

The analyzer board 31 allows debugging and monitoring of the signals on the backplane 19. The analyzer board 31 plugs directly into the adapter board 21B, 25B (FIG. 6) and monitors and decodes the high-speed serial links routed on the adapter board 21B, 25B. In this example, backplane 19 contains 128 channels (i.e., eight channels between each director board 18B, 22B and a corresponding one of the eight memory boards 28B, thus for eight front end director boards 21B and for eight back end director boards 22B there are 128 channels) with each channel composed of two full-duplex here, for example, 1.25 Gb/sec or 2.5 Gb/sec serial links.

Because of real-estate constraints on the adapter board 21B, 25B, since the analyzer board 31B support circuitry has to coexist with regular adapter circuitry the number of channels being concurrently monitored by the analyzer board 312B is reduced from eight channels. More particularly, the eight incoming channels REDUNDANT_CH0 through REDUNDANT_CH07 are reduced by a factor of 4 by going through 2 level of selection process. Thus, each analyzer board 31B is only capable of simultaneously analyzing two out of the eight channels coming from the connector 56 on the adapter board 25B to which it is connected. More particularly, the first level of channel selection is accomplished in the way the analyzer board 31B is physically plugged into connector 56 on the adapter board 25B. As will be described in more detail in connection with FIGS. 7A, 7B and 7C, the connector 56 has physical locations for only 7 ports, each port comprising a low byte link and a high byte link, i.e., a channel having 4 pins 59) and electrical connections for only 4 ports, and the 4 connections are spaced out along the 7 spots on the connector 56 in an alternating pattern with the no connects. That is, while the adapter board connector 54 is plugged into eight channels REDUNDANT_CH0 through REDUNDANT_07, disposed in a linear array along the connector 53, the analyzer board 31B connector 56 has a length is shorter than the length of the adapter board connector 56 by one channel length, L.

Figure 7A:
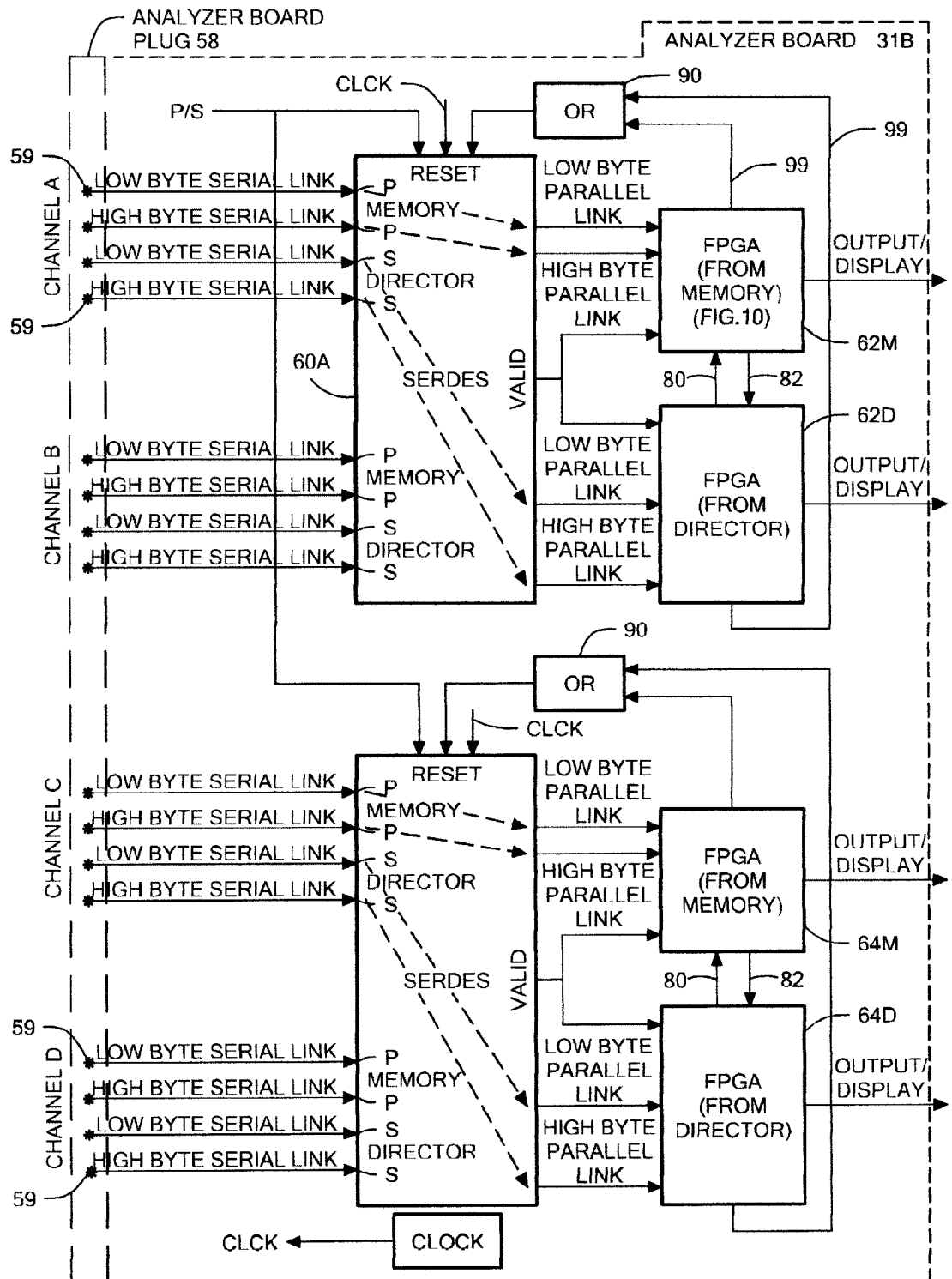
FIG. 7A is a block diagram of an exemplary of the analyzer boards of FIG. 4.
Figure 7B:
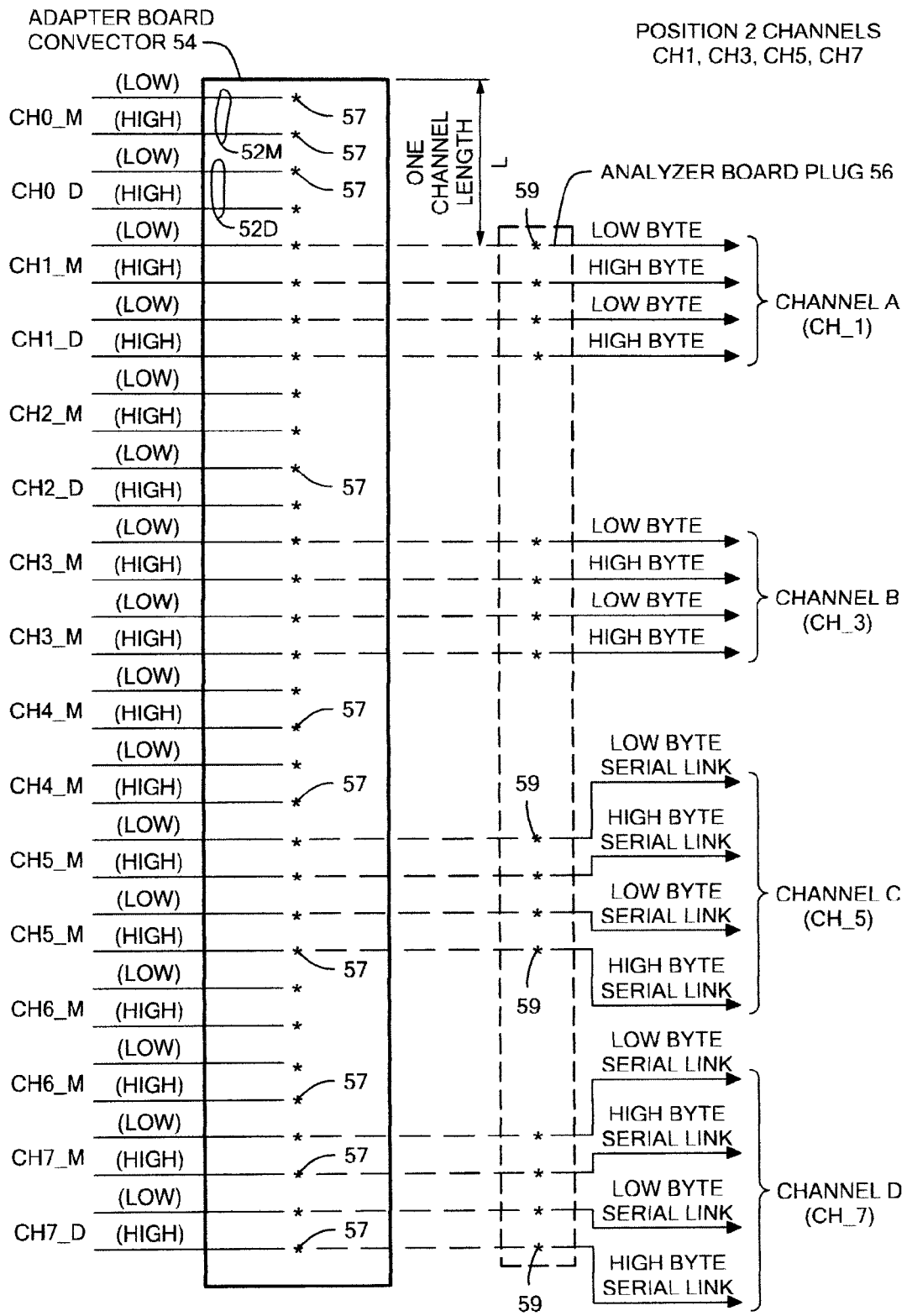
FIG. 7B is a diagram showing a connector of an exemplary one of the adapter boards of FIG. 4 and a plug of an exemplary one of the analyzer boards of FIG. 4 in a first mating position.
Figure 7C:
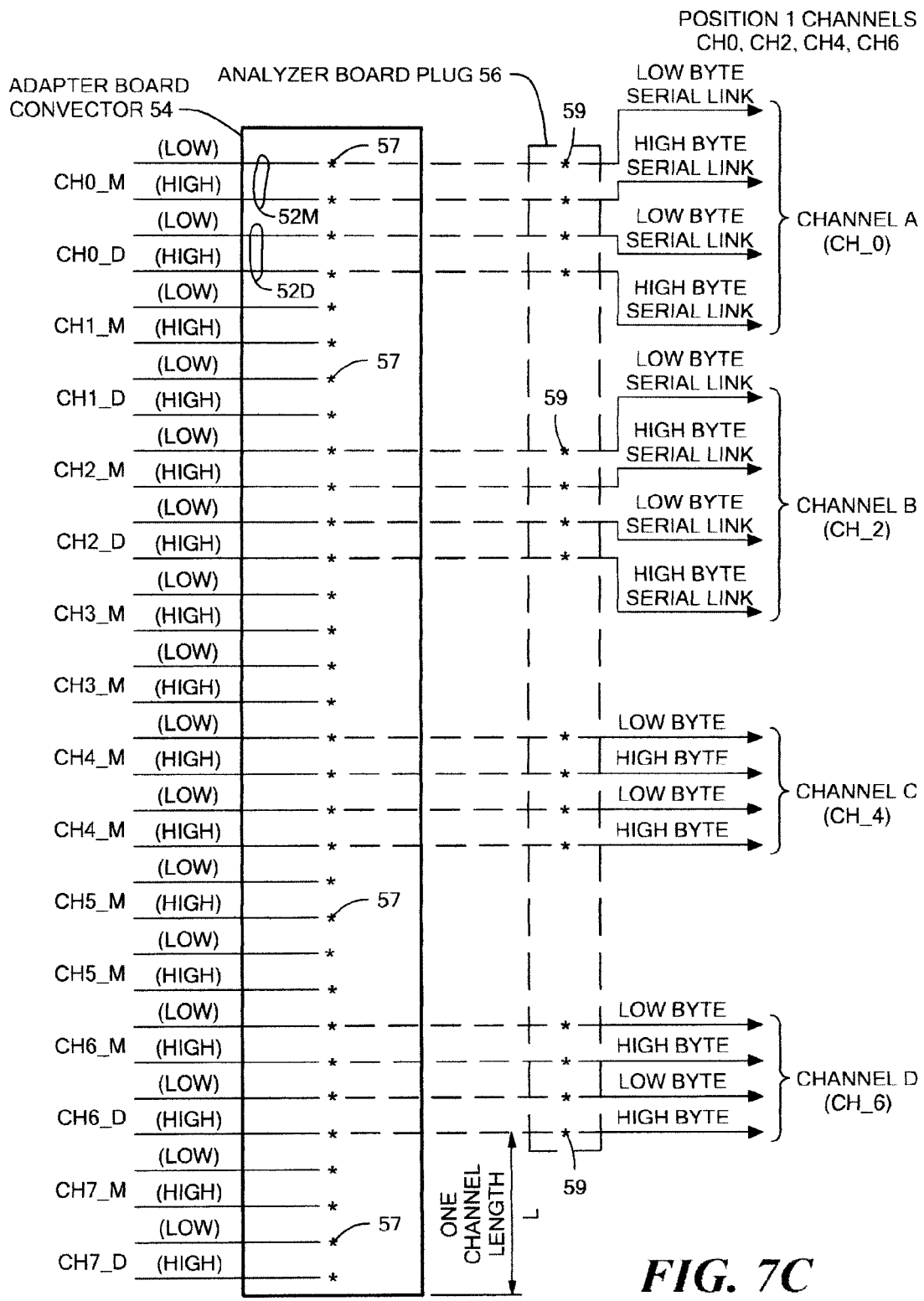
FIG. 7C is a diagram showing a connector of an exemplary one of the adapter boards of FIG. 4 and a plug of an exemplary one of the analyzer boards of FIG. 4 in a second mating position.

Thus, referring to FIGS. 7B and 7C, connector 54 has 32 pins 57, each set of 4 pins 57 handling one channel, each channel having four pins 57, one pair of 4 pins 57 handing the high byte link and a low byte link from a director board and the other pair handing the high byte link and a low byte link from a memory board. However, the analyzer board plug or connector 56 has only 16 pins 59, each set of 4 pins 59 handling one channel, each channel having four pins 59, one pair of 4 pins 59 handing the high byte link and a low byte link from a director board and the other pair handing the high byte link and a low byte link from a memory board. It is noted that the length of the analyzer board connector 56 is shorter than the adapter board connector 54 by the space occupied by four pins, i.e., one channel, on adapter board connector 54.

With this configuration, the user is allowed to connect to all even or all odd ports on the adapter board 41B connector 56 simply by plugging in the analyzer board 31B aligned to the bottom of the connector 56 or the top of the connector 56.

More particularly, referring to FIG. 7A, an exemplary one of the analyzer boards 31B of analyzer 31 (FIG. 1) is shown. The analyzer board plug 56 has 16 pins, each set of four pins being associated with one of the REDUNDANT CHANNELS CH0-CH7. Thus, the analyzer board 31B is connectable, at any one time to four of these eight redundant channels. Thus, referring to FIG. 7B, as noted above, the adapter connector 54 has 32 pins to connect with the 32 lines from each one of the adapter boards 21B, 25B: Four lines for each of the eight redundant channels, REDUNDANT_CH0 through REDUNDANT_07, each channel having a pair of lines for the high and low links of signals from the memory board 28B connected to it, and a pair of lines for the high and low links of signals from director board 18B, 22B connected to it. For example, REDUNDANT CHANNELS_CH0 has a pair of lines from the memory board (i.e., CH0_M high and CH0_M low) and a pair of lines from the director board (i.e., CH0_D high and CH0_D low), as indicated in FIG. 7B. As noted in FIG. 7A, the analyzer board plug 56 has only 16 pins. It is noted that the analyzer plug 56 is shorter than the adapter board plug 54 by the length occupied by the pins for one channel, i.e., four pins. In the position shown in FIG. 7B, the pins of plug 54 for the odd numbered channels (i.e., REDUNDANT_CH1, REDUNDANT_CH3, REDUNDANT_CH5 and REDUNDANT_CH7) are disposed in the regions between the even numbered channels (i.e., REDUNDANT_CH0, REDUNDANT_CH2, REDUNDANT_CH4 and REDUNDANT_CH6). Thus, when plug 56 is inserted to mate with plug 54 as shown in FIG. 7B, the odd numbered channels (i.e., REDUNDANT_CH1, REDUNDANT_CH3, REDUNDANT_CH5 and REDUNDANT_CH7) are electrically connected to the analyzer board 31B, FIG. 7A. Referring now to FIG. 7C, when plug 56 is inserted to mate with plug 54 as shown in FIG. 7B, the even numbered channels (i.e., REDUNDANT_CH0, REDUNDANT_CH2, REDUNDANT_CH4 and REDUNDANT_CH6) are electrically connected to the analyzer board 31B, FIG. 7A. By having the odd numbered channels (i.e., REDUNDANT_CH1, REDUNDANT_CH3, REDUNDANT_CH5 and REDUNDANT_CH7) disposed in the regions between the even numbered channels (i.e., REDUNDANT_CH0, REDUNDANT_CH2, REDUNDANT_CH4 and REDUNDANT_CH6), stresses and insertion mismatches are reduced during the mating process.

Thus, in either case, the analyzer board plug 56 has four sets of four pins, each set monitoring a corresponding one of four channel, A, B, C and D. When in the position shown in FIG. 7B, channels A, B, C and D are the REDUNDANT_CH1, REDUNDANT_CH3, REDUNDANT_CH5 and REDUNDANT_CH7, respectively, and when in the position shown in FIG. 7C, channels A, B, C and D are the REDUNDANT_CH0, REDUNDANT_CH2, REDUNDANT_CH4 and REDUNDANT_CH6, respectively.

The second level of channel selection is performed by the receiving SERDES 60A, 60B, FIG. 7, on the analyzer board 31B. Each SERDES 60A, 60B, can only de-serialize one channel but the SERDES have input for two (primary and secondary inputs, P and S, respectively) and the one to be de-serialized is selected by a control signal on the SERDES that is tied to an input control signal P/S on the analyzer board 31B. Through the use of the primary and secondary input selection the four channels coming from to the analyzer board 31B connector 56 are reduced to 2 channel which is the number that can be processed by an FPGA 62M, 62D, 64M, 64D, on the analyzer board 31B.

That is, all eight channels REDUNDANT CH0-REDUNDANT CH7 are brought out to the adapter board 21B, 25B from the backplane 19 and buffered/amplified and then brought to the receptacle 56 at the outside edge of the adapter board 21B, 25B. Up to this point there is still no monitoring, it is just replication (copy links), routing and buffering of channels to bring them outside of the system enclosure and out to the analyzer equipment and by design all channels are replicated and made accessible from outside the system. The analyzer board 31B can only monitor two channels at a time but the outer receptacle 56 has eight. By physically moving of the analyzer board 31B connector 56 along the adapter board 21B, 25B receptacle is part of the mechanism of the technician selects the two out of the eight redundant channels REDUNDANT CH0-REDUNDANT CH7 to observe.

Thus, the analyzer board 31 allows the user to view two channels at a time. Each adapter board 21B, 25B, as described above in connection with FIG. 5, includes eight redundant channels, REDUNDANT CH0 through REDUNDANT CH7. By moving the micro-analyzer to another position the other two pairs can be monitored and decoded. Here, the analyzer board 31B incorporates micro-connectors to facilitate connection to a Tektronics or Agilent logic Analyzer.

Referring again to FIG. 7A, the analyzer board 31B includes a pair of Serializer-Deserializer (SERDES) devices 60A, 60B, each having a redundant transmit (TX) port (i.e., a primary TX port P and a redundant TX port S). An example of a SERDES device that is similar to that described above is the VSC7216 which is provided by Vitesse Semiconductor Corporation of Camarillo, Calif.

Thus, in response to a primary control signal P fed to the SERDES 60A on the line P/S, the high and low byte serial links from the memory channel A are converted by the SERDES 60A into corresponding parallel words, or parallel high and low byte links, respectively, and coupled to an FPGA 62M while the high and low byte serial links from the director channel A are converted by the SERDES 60A into corresponding parallel words, or parallel high and low byte links, respectively, and coupled to an FPGA 62D, as indicated by the dotted arrows.

On the other hand, in response to a secondary control signal S fed to the SERDES 60A on the line P/S, the high and low byte serial links from the memory channel B are converted by the SERDES 60A into corresponding parallel words, or parallel high and low byte links, respectively, and coupled to a FPGA 62D while the high and low serial byte links from the director channel B are converted by the SERDES 60A into corresponding parallel words, or parallel high and low byte links, respectively and coupled to a FPGA 62D.

Likewise, the primary control signal P fed to the SERDES 60B on the line P/S, the high and low byte serial links from the memory channel C are converted into corresponding parallel words, or parallel high and low byte links, respectively, and coupled to an FPGA 64M while the high and low byte links from the director channel C are converted into corresponding parallel words, or parallel high and low byte links, respectively, and coupled to an FPGA 64D, such coupling being indicated by the dotted arrows.

On the other hand, in response to the secondary control signal S fed to the SERDES 60B on the line P/S, the high and low byte links from the memory channel D are converted into corresponding parallel words, or parallel high and low byte links, respectively, and coupled to an FPGA 64M while the high and low byte links from the director channel D are converted into corresponding parallel words, or parallel high and low byte links, respectively, and coupled to an FPGA 64D.

Each one of the FPGAs 62M, 62D, 64M, and 64D is identical in constriction, an exemplary one thereof, here FPGA 62M being shown, and to be described in connection with FIG. 10. It is noted that reset signals from FPGAs 62M and 62D are fed to an OR gate 90, the output of such OR gate 90 being fed to the RESET of SERDES 60A. These reset signals from FPGAs 62M and 62D are generated in a manner to be described in more detail in the flow diagram of FIG. 8. In like manner, reset signals from FPGAs 64M and 64D are fed to an OR gate 92, the output of such OR gate 92 being fed to the RESET of SERDES 60B.

Figure 10:
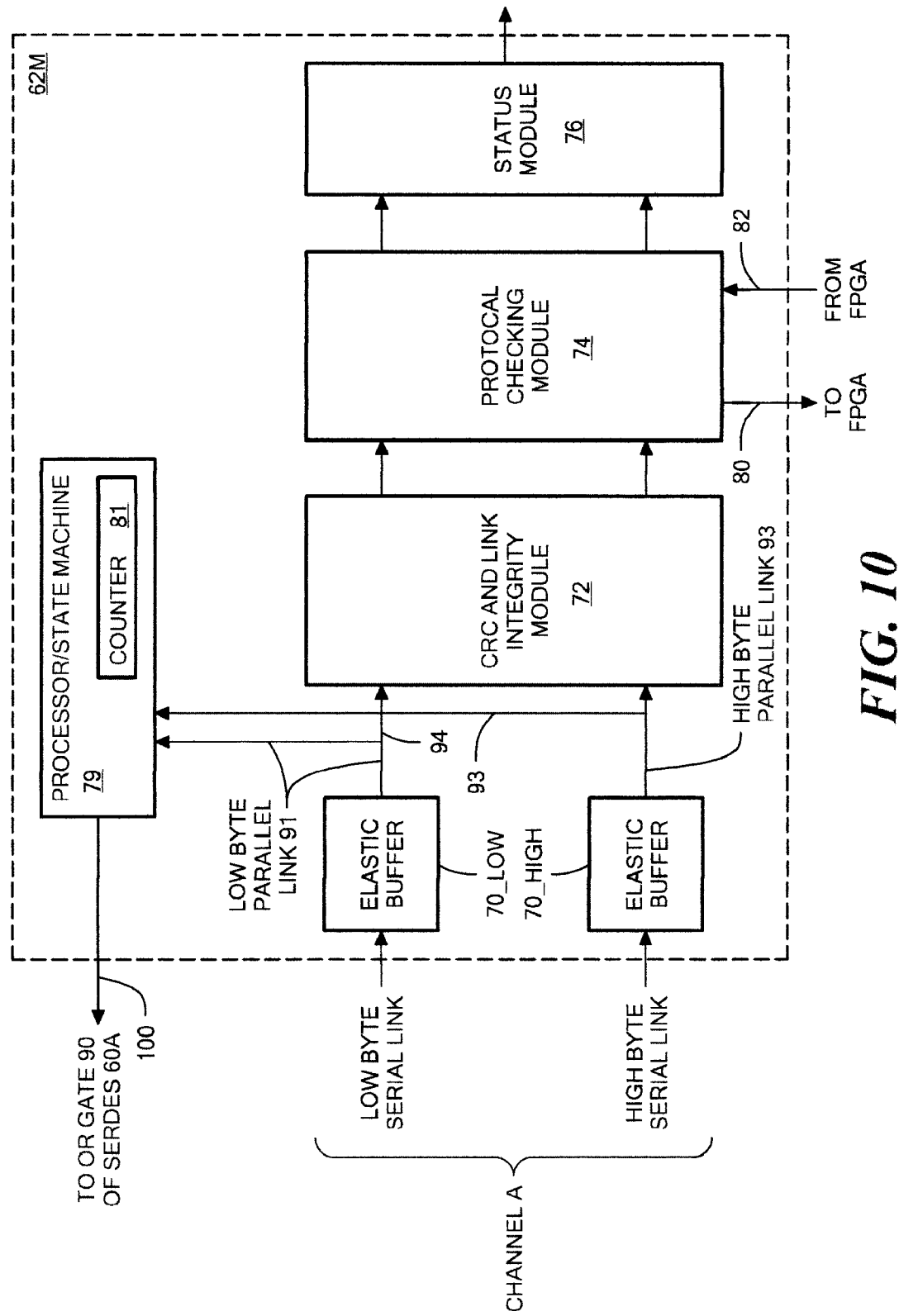
FIG. 10 is a block diagram of an FPGA used in the analyzer board of FIG. 4.

Referring now to FIG. 10 exemplary FPGA 62M is shown fed signals from the memory via the low byte parallel link of memory channel A and the high byte parallel link of memory channel A. The FPGA 62M includes a pair of elastic buffers 70_LOW and 70_HIGH, each one fed by the low byte parallel link of channel A and the high byte parallel link of channel A, respectively as indicated. The FPGA 62M includes, a cyclic redundancy check (CRC) and link integrity module 72, a protocol checking module 74 and a status module 76. A state machine 80 is included.

During operation, each elastic buffer 70_LOW, 70_HIGH receives a de-serialized (i.e., parallel) version of a point-to-point signal. The elastic buffer 70_LOW receives de-serialized information from one signal of the set of point-to-point signals of, here memory channel A, here the low byte parallel link 91, and the elastic buffer 70_HIGH receives de-serialized information from another signal of the set of point-to-point signals of, here memory channel A, here the high byte parallel link 93. The elastic buffers 70_LOW. 70_HIGH compensate for slight differences in clocking speed of the originator of the set of point-to-point signals (here the memory board 28B (FIG. 4) clock, not shown) and clocking speed on the adaptor board 25B. For example, the elastic buffers 70_LOW. 70_HIGH are equipped to (i) add or drop idle timing characters (e.g., K28.5 characters) from the data stream and (ii) notify subsequent circuitry of such a change. After the elastic buffers 70_LOW. 70_HIGH capture the de-serialized information, the elastic buffers 70_LOW. 70_HIGH provide the de-serialized information to the CRC and link integrity module 72.

Upon receipt of the de-serialized information, the CRC and link integrity module 72 processes the de-serialized information from a CRC and link integrity perspective. In particular, the CRC and link integrity module 72 determines whether there are any bit errors in the incoming data. If there are no bit errors in the data, the CRC and link integrity module 72 checks a CRC value within the data in view of other data components (e.g., an address/command frame, a data frame, a status frame, etc.). In one arrangement, the CRC checking operations are activated and deactivated by control logic within the CRC and link integrity module 72 which keeps track of transactions taking place on the channel. In particular, the control logic activates the CRC checking operation in response to receipt of an address/command frame, a data frame, or a status frame.

It should be understood that, in one arrangement, the CRC and link integrity module 72 is flexible and can be programmed to perform protocol checking operations for other protocols, e.g., protocols in which a CRC value is not present. For example, the CRC and link checking module 72 can be configured to perform parity checking, or applying other error checking algorithms. Additionally, the CRC and link checking module 72 can be configured to detect more or less bit fields (e.g., an extra byte or an extra command contained in the data), and bit fields arranged in different orders. Accordingly, in some arrangements, the CRC and link integrity module 72 operates generally to perform error checking and/or link integrity operations.

After the CRC and link integrity module 72 processes the data, the CRC and link integrity module 72 passes the data, and its processing results (e.g., indications whether there are any bit errors, CRC checking results, etc.) to the protocol checking module 74. The protocol checking module 74 keeps track of various data-formatting attributes such as verifying that the frames are in the proper format and length, verifying that the frames are in the proper order and that no erroneous activities took place, etc. In one arrangement, the protocol checking module 74 of FPGA 62M, FIG. 7A, which handles the point-to-point signals from here, for example, a particular memory board 28B communicates with a corresponding protocol checking module 74 of the FPGA 62D handling the point-to-point signals from the director board 22B (FIG. 4) for additional protocol scrutiny (e.g., to verify that the memory module 28 sends back requested data during a write transfer). To this end, the protocol checking module 168 of FPGA 62M sends signals through the conductor 80 to the FPGA 62D and receives signals from FPGA 62D through the conductor 82 with the corresponding protocol checking module of FPGA 62D connected on the conductor 82. In this way, the protocol checking modules 74 can tell each other what they are doing so that neither violates protocol. For example, if one protocol checking module 74 observes a read command, that protocol checking module 74 can notify the corresponding protocol checking module to expect a memory response in response to the read command. The protocol checking module 74 then passes the data and processing results (e.g., a combination of results from the CRC and link integrity module 72) to the status module 76.

The status module 76 generates an explanation/status code for each character of the data fed to it. In one arrangement, the status module 76 provides an explanation/status code for each character of the data, as well as each character of statistical information gathered by the circuitry of the previous pipelined stages. The status module 76 then outputs the data and the status codes for transfer to a logic analyzer/display, not shown, (e.g., how much traffic is passing through the monitored channel).

The analyzer board 31 and the redundant ports are designed to enable hot plugging into the adapter board. Hot plugging an analyzer board 31B with multiple serial receivers can cause the serial links to be received misaligned even if they were transmitted synchronously. There are several reasons for this occurrence: The main cause is that when the analyzer board 31B is inserted into the connector 65 on the adapter board 21B, 25B, some of the serial link pins may make contact before others which would make it look to the analyzer board 31B that some links came up before others. If one link in a channel comes up before the other several inherent processes in the SERDES can cause it to be shifted by several clocks relative to the other link.

This shift occurs because once the SERDES detects a valid signal it will begin the process of transferring the incoming data to the local clock (there exists as small difference in frequencies of the transmitter and receiver clocks due to slight differences in oscillators, and it must be compensated for) which the SERDES does by adding or dropping as needed a special 8B10B character (K28.5-BCh (IDLE)). If an add or a drop is performed on a link before its counterpart becomes valid the link will 1 be offset by 1 clock from the first signal. The reason for this is that add/drops occurs on the high and the low links roughly at the same time since they come from the same source. This means that when both links are active each will add or drop characters at about the same time which means that if at the time when the 2 links became valid they were aligned they will be misaligned by one character for the short time between an add/drop on one link and before its counterpart's add/drop. The elastic buffer can compensate for (i.e., mask) this brief 1 character misalignment.

On the other hand if, when the 2 links become valid they were misaligned by 1 character because of hot plugging them, in the time between and add/drop on one of the links but before an add/drop on the other they may become misaligned by 2 characters. This is a condition which may occur during hot plugging as when the pins of the analyzer board 31B of one link (say the high link) become engaged with the pins of the adapter board well after the engagement of the pins of the other link (here the low link) of the analyzer board 31B. The elastic buffer cannot compensate for any resulting misalignment by 2 or more characters.

Figure 9:
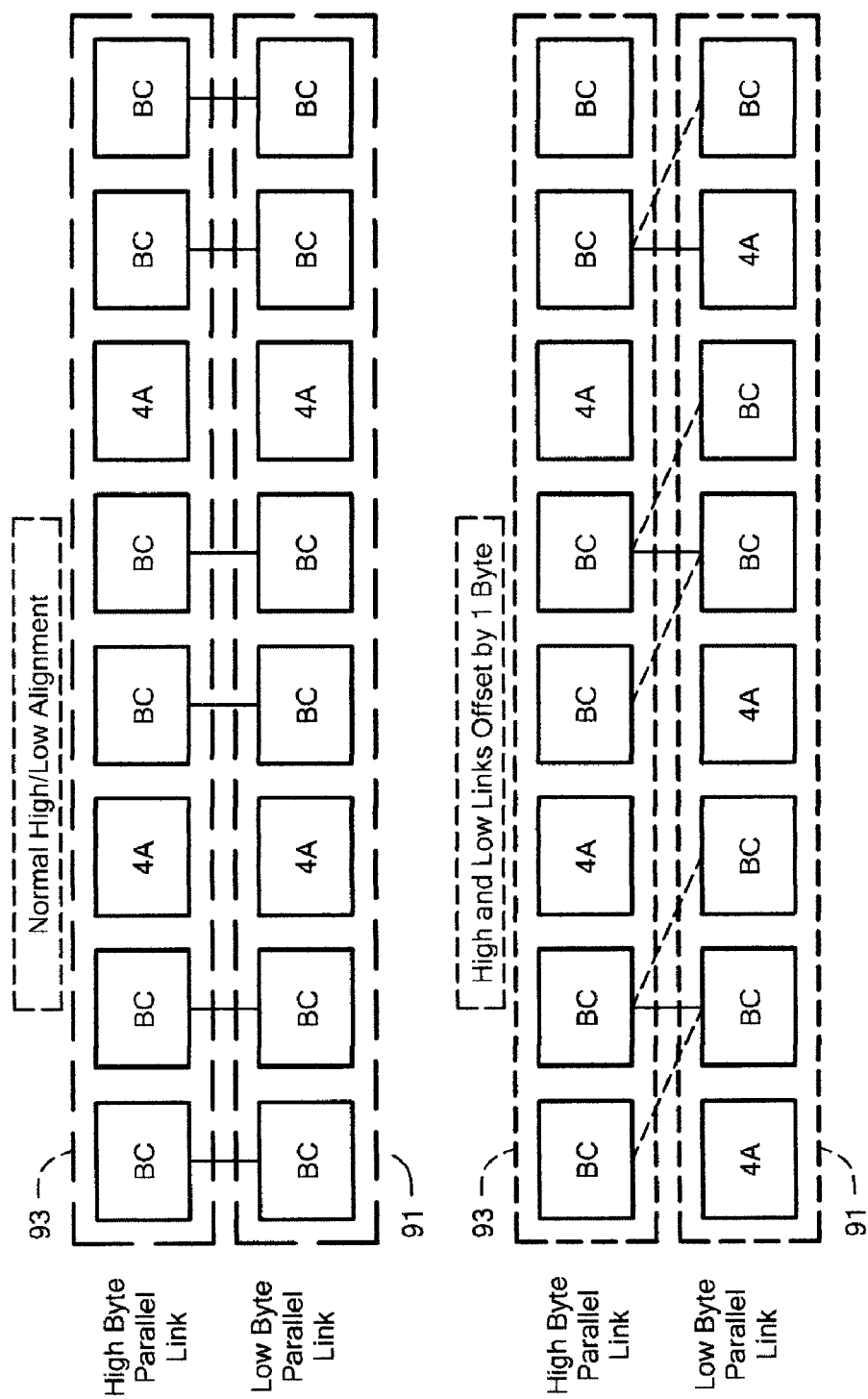
FIG. 9 is a diagram showing the effect of a misalignment between a high byte link and a low byte link used to communicate the analyzer board of FIG. 4.

FIG. 9 is a diagram of how a properly aligned link looks relative to a misaligned link, where "BC" represents the K28.5 idle character and "4A" represents a piece of data.

More particularly, in a protocol there are normal characters, such as "BC" in FIG. 9, and special characters, such as "4A" in FIG. 9. These special characters are sometimes referred to as K characters, e.g., timing characters. Thus, normal data is, for example 8 bit data. In addition there are special K characters. Therefore, at any one time, there is a normal character on the high byte link and a normal character on the low byte link, the two links are aligned. Likewise, if, at any one time, there is a special character on the high byte link and a special character on the low byte link, the two links are aligned if the two special characters are of the same type. The case when the two links (i.e., the high byte link and the low byte link) are aligned is shown in the upper portion of FIG. 9.

On the other hand, if, at any one time, there is a normal character on the high byte link and a special character on the low byte link, the two links are not aligned. Likewise, if, at any one time, there is a special character on the high byte link and a special character on the low byte link, but the two special characters are of different types the two links are not aligned. A case when the two links (i.e., the high byte link and the low byte link) are not aligned is shown in the lower portion of FIG. 9.

Figure 8:
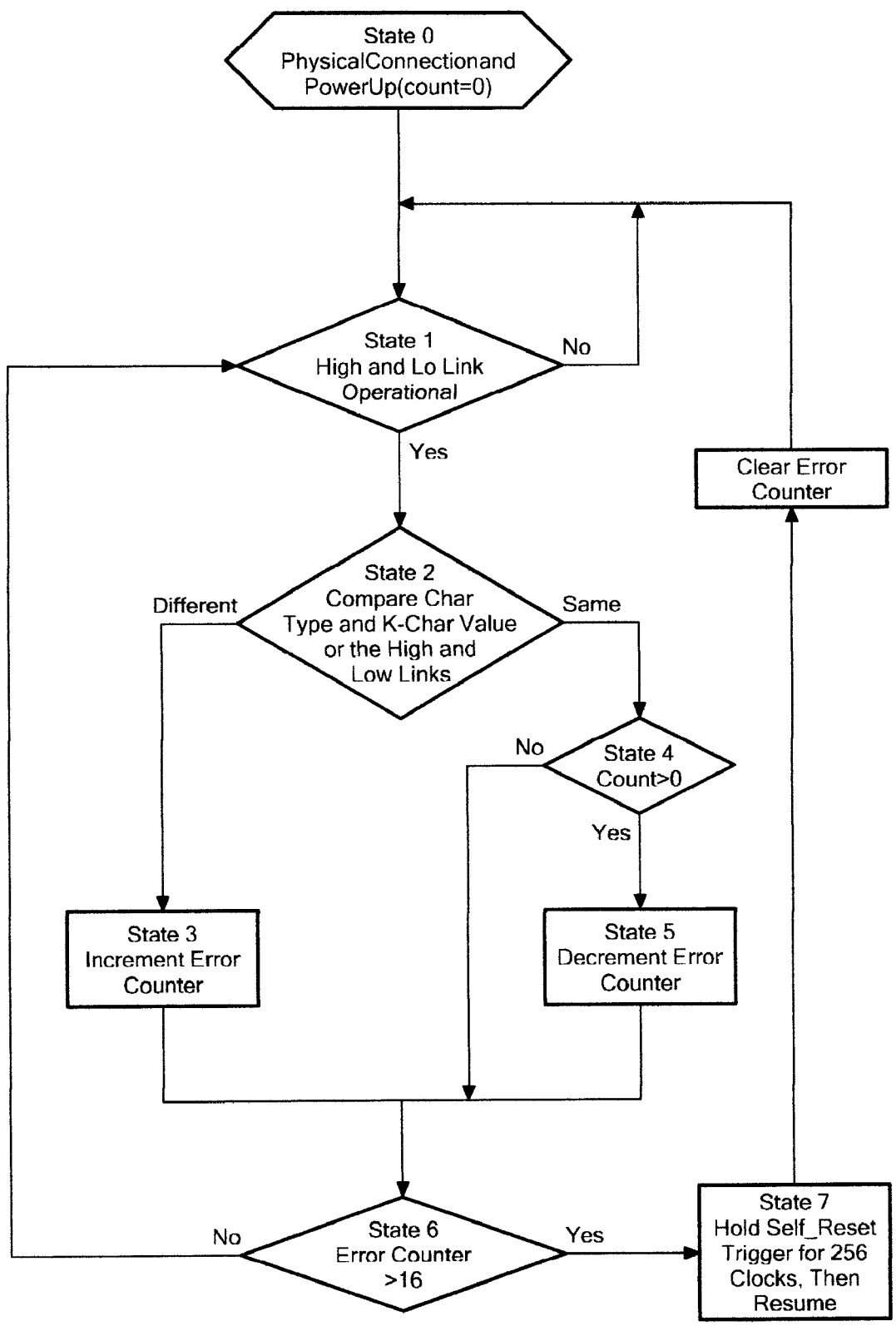
FIG. 8 is flow diagram of the operation of a state machine used in a Field Programmable Gate Array (FPGA) used in the analyzer board of FIG. 4.

A self-rest circuit, on the analyzer board 31B, here a processor and state machine 79 (FIG. 10) operating in accordance with a flow diagram shown in FIG. 8, is designed to activate when both high and low byte parallel links 91, 93 become operational (receiving valid data). It should be noted that it should be noted that the elastic buffer will mask a misalignment of 1 character that is cause by normal add/drop operation from the self reset circuit to be described, but will not be able to properly mask a 2 character misalignment potentially caused by a hot plugging of the board. The function of the self reset circuit is to detect and remedy a situation where there are two or more character misalignments.

Initially, an error counter 81 (FIG. 10) in the state machine 100 is reset to zero). Next, in state 0, the state machine 79 determines whether there is a physical connection between the analyzer board plug 56 and the adapter board plug 54 (FIGS. 7B and 7C). Next, in state 1, the state machine 79 determines whether the low byte parallel link 91 and the high byte parallel link 93 are operation by monitoring the high byte and low byte parallel link outputs 91, 93 from the elastic buffers 70_LOW and 70_HIGH, respectively, as shown in FIG. 10.

If, in state 1, it is determined that either the high byte parallel link 93 or the low byte parallel ink 91 is offline (i.e., not operation), the state machine 100 will allow the error counter 81 (FIG. 19) in the state machine 79 to remain in a clear error counter, or zero contents, state and the process resumes. A parallel link 91, 93 is considered operational when the SERDES 60A reports on its VALID output to the state machine 79 that it has synchronized to the incoming serial data link stream and is receiving valid 8B10B data. It should be understood that even though the SERDES reports a VALID at its output indicating the SERDES and the FPGA are synchronized, the high byte parallel link 93 and the low byte parallel link 91 may not be aligned one with the other as described above in connection with FIG. 9.

Once both the high byte parallel link 93 and the low byte parallel link 91 become operational, the state machine 79 compares, in state 2, the character types on the high and low byte parallel links 91, 93. In addition, the characters are K-28 characters and any other special characters are compared. That is, a determination is made by comparing the data and special characters of the high byte parallel link 93 with the data and special characters of the low byte parallel link 91 whether the high and low byte links fed to the FPGA are aligned. More particularly, as described above, if at any one time, there is a normal character on the high byte parallel link 93 and a normal character on the low byte parallel link, the two links are aligned. Likewise, if, at any one time, there is a special character on the high byte parallel link 93 and a special character on the low byte parallel link 91, the two links are aligned if the two special characters are of the same type, as shown in the upper portion of FIG. 9.

On the other hand, if, at any one time, there is a normal character on the high byte parallel link 93 and a special character on the low byte parallel link 91, the two links are not aligned. Likewise, if, at any one time, there is a special character on the high byte parallel link 93 and a special character on the low byte parallel link 91, but the two special characters are of different types the two links are not aligned, as shown in the lower portion of FIG. 9.

If the two links are aligned, i.e. all of the character types and all of the K-characters are the same for the high byte parallel link and the low byte parallel link, the parallel links are considered to be aligned for this set of data (i.e., the links are aligned) and, if the contents of the error counter 81 is greater than zero (state 4), the contents of alignment error counter 81 is decremented by one count, state 5; however, if comparison in state 2 fails (i.e., if the two links are not aligned), then the contents of the alignment error counter 81 is incremented by one count (State 3). If, the state 4 the contents of error counter 81 is less than zero, the state machine 80 returns to state 1.

Thus, the contents of error counter 81 provides the number of misalignments as the information in the data (i.e., normal and special characters) are transferred through the CRC and link module integrity module 72.

After the increment/decrement operation in state 5 or state 3, respectively, the error counter 81 contents are checked to determine if it is less than a predetermined number, here for example 16 (State 6). If the contents are less than the predetermined number, here 16, then the comparison routine is repeated for the next set of characters and the state machine 80 returns to state 1. On the other hand, if the contents of error counter 81 is greater than the predetermined number, here, for example, 16 in state 6, the state machine proceeds to state 7.

In state 7, if the parallel links were misaligned here 16 times, here a logic 1 signal is fed by the state machine 79 on line 100 for a sufficient period of time to reset the SERDES 60A. That is, here would be enough alignment errors to quickly bring the error counter 81 to the predetermined count of 16 and if that happens, the state machine 79 will apply a reset signal on line 100 for a sufficient period of time (i.e., for a predetermined number of clock pulses, CK fed to the SERDES 60A by a clock 83 on the analyzer board 31B, here for 256 clock pulses (State 7)) (i.e., long enough for the external power-on reset chip on the SERDES 60A and then clear the error counter 81. The process resumes. The state machine 79 itself is not affected by the SERDES 60A RESET and continues operating normally.

It is noted that the SERDES 60A is reset in response to a reset signal being produced on line 80 by either FPGA 62M for the memory data or from FPGA 62D for the director data.

In summary then, a transmitter board, here an adapter board 25B (FIG. 4) transmits a copy of signals in a system being analyzed to the system analyzer board 31B. The copy of such signals, here from either the director board 22B or from the memory board 25B, comprises serial data in a low byte serial link and in a high byte serial link. The signals include special characters interspersed in a pattern with the data in the low and high byte serial links. An analyzer board includes a serializer-deserializer for receiving the transmitted serial data when the analyzer board is plugged into the transmitter board for converting the received data and the interspersed special characters in both the low and high byte serial links into corresponding data and interspersed special characters in low byte and high byte parallel links. A mismatch between the data and the interspersed pattern of special characters in the converted low byte parallel link and the pattern of special characters in the converted high byte parallel links resets the serializer-deserializer.

It should be noted that, the user preferably can configure complex triggers to selectively capture data or trigger on complex events. A logic analyzer similar to that described above is provided by Tektronix, Inc. of Beaverton, Oreg. Additionally, ancillary components and related equipment (e.g., expansion boxes, cables, etc.) which are suitable for use with the logic analyzer 31 described above is also provided by Tektronix, Inc. of Beaverton, Oreg. Another logic analyzer similar to that described above is provided by Agilent Technologies of Palo Alto, Calif.

A number of embodiments of the invention have been described. Nevertheless, it will be understood that various modifications may be made without departing from the spirit and scope of the invention. Accordingly, other embodiments are within the scope of the following claims.

What is claimed is:

1. A system comprising:
   a transmitter board for transmitting a copy of signals produced in such system, the copy of such signals comprises serial data in a low byte serial link and in a high byte serial link, the signals include special characters interspersed in a pattern with the data in the low and high byte serial links;
   a system analyzer board comprising:
      a serializer-deserializer for receiving the transmitted serial data when the analyzer board is plugged into the transmitter board, and for converting the received data and the special characters interspersed in both the low and high byte serial links into corresponding data and the interspersed special characters in low byte and high byte parallel links; and
   a logic for determining mismatches between the data and the interspersed pattern of special characters in the converted low byte parallel link and the data and the interspersed pattern of special characters in the converted high byte parallel link and for producing a reset signal for the serializer-deserializer when a predetermined plurality of mismatches is determined.

2. The system recited in claim 1 wherein the logic maintains a count of the number of mismatches, such system providing the reset signal to the serializer-deserializer when a predetermined plurality of mismatches has been indicated.

3. A system analyzer, comprising;
   a transmitter board for transmitting a copy of signals being produced in a system for analysis by the system analyzer, the copy of such signals comprising serial data, each such data being in a series a low byte serial link and a high byte serial link, such signals including with the data and special characters interspersed in a pattern with the data in the low byte serial link and interspersed with the data in such high byte serial link;
   an analyzer board adapted for plugging into the transmitter board, such analyzer board comprising:
      a serializer-deserializer for receiving the transmitted serial data when the analyzer board is plugged into the transmitter board, and for converting the received data and the special characters interspersed therewith in the low byte serial link into corresponding a low byte parallel link and concurrently converting the received data and the special characters interspersed therewith in the high byte serial link into a corresponding high byte parallel link;
      a system for determining whether the data and interspersed pattern of special characters in the converted low byte parallel link mismatch the data and the interspersed pattern of special characters in the converted high byte parallel link, a determined mismatch indicating the high byte parallel link is not aligned with the low byte parallel link, such system maintaining a count of the number of mismatches, such system providing a reset signal to the serializer-deserializer when a predetermined plurality of mismatches has been indicated.

4. A system analyzer, comprising;
   a transmitter board for transmitting a copy of signals being produced in a system for analysis by the system analyzer, the copy of such signals comprising serial data, each such data in the series having lower significant bytes thereof in a low byte serial link and having more significant bytes thereof in a high byte serial link, such signals including with the data, special characters interspersed in a pattern with the bytes of each of the data in such low byte serial link and interspersed with the bytes of each of the data in such high byte link serial data;
   an analyzer board adapted for plugging into the transmitter board, such analyzer board comprising:
      a serializer-deserializer for receiving the transmitted serial data when the analyzer board is plugged into the transmitter board, and for converting the received low significant bytes of each data and the special characters interspersed therewith in the low byte serial link into corresponding lower significant bytes in a parallel low byte link and concurrently converting the received higher significant bytes in each data and the special characters interspersed therewith in the high byte serial link into corresponding parallel higher significant bytes in a parallel high byte link;
      a system for determining whether the data and pattern of special characters in the parallel low byte link matches the data and the pattern of special characters in the parallel high byte link, a determined match indicating the high byte parallel link is aligned with the low byte parallel link and a mismatch indicating the high byte parallel link is not aligned with the low byte parallel link, such system maintaining a count of the number of mismatches, such system providing a reset signal when a predetermined plurality of mismatches has been indicated; and
      wherein the reset signal is fed to the serializer-deserializer to reset such serializer-deserializer.

5. An interface, comprising:
   a plurality of director boards;
   a plurality of memory boards, each one of the director boards being connected to the plurality of memory boards with a corresponding one of a plurality of point-to-point serial bus primary channels, a director board-to-memory board portion of each one of such primary channels passing signals from such one of the director boards and the corresponding one of the memory boards and a memory board-to-director board portion of each one of such primary channels passing signals from such corresponding one of the memory boards to such one of the director boards;
   a plurality of adapter boards, each one being connected to a corresponding one of the director boards, each one of the plurality of adapter boards receiving a copy of signals from the director board-to-memory board portion of each one of such primary channels passing signals from the one of the director boards connected thereto and receiving a copy of signals from the a memory board-to-director board portion of each one of such primary channels passing signals from the corresponding one of the director boards connected thereto, the copy of the memory board-to-director board portion having a high byte serial link and a low byte serial link and the copy of the memory board-to-director board portion having a high byte serial link and a low byte serial link;

a plurality of analyzer boards, each one being pluggable into a corresponding one of the adapter boards, each one of such analyzer boards, comprising:

a serializer-deserializer for converting:
the copy of the memory board-to-director board portion having the low byte serial link into a low byte parallel link representing the low byte serial link of the copy of the memory board-to-director board portion;
the copy of the memory board-to-director board portion having the high byte serial link into a high byte parallel link representing the high byte serial link of the copy of the memory board-to-director board portion;
the copy of the director board-to-memory board portion having the low byte serial link into a low byte parallel link representing the low byte serial link of the copy of the director board-to-memory board portion; and
the copy of the memory board-to-director board portion having the high byte serial link into a high byte parallel link representing the high byte serial link of the copy of the director board-to-memory board portion;

a logic for determining:
whether the low byte parallel link representing the copy of the memory board-to-director board portion is aligned with the high byte parallel link representing the copy of the memory board-to-director board portion; and
whether the low byte parallel word representing the copy of the director board-to-memory board portion is misaligned with the high byte parallel link representing the copy of the director board-to-memory board portion;

such logic producing a reset signal if such logic determines either:
the low byte parallel link representing the copy of the memory board-to-director board portion is misaligned with the high byte parallel link representing the copy of the memory board-to-director board portion; or
the low byte parallel link representing the copy of the director board-to-memory board portion is misaligned with the high byte parallel link representing the copy of the director board-to-memory board portion; and
wherein such reset signal is fed to the serializer-deserializer to reset such serializer-deserializer.

6. The interface recited in claim 5 wherein:
the copy of the director board-to-memory board portion has in the high byte serial link thereof special characters interspersed in a pattern with the data in the high byte serial link thereof and has in the low byte serial link thereof special characters interspersed in a pattern with the data in the low byte serial link thereof,
the copy of the director board-to-memory board portion has in the high byte serial link thereof special characters interspersed in a pattern with the data in the high byte serial link thereof and has in the low byte serial link thereof special characters interspersed in a pattern with the data in the low byte serial link thereof, the serializer-deserializer:
converts the copy of the director board-to-memory board portion high byte serial link and the special characters interspersed with the data in the high byte serial link thereof into corresponding parallel higher significant bytes of the high byte parallel link thereof and concurrently converts the copy of the director board-to-memory board portion low byte serial link and the special characters interspersed with the data in the low byte serial link thereof into corresponding parallel lower significant bytes of the low byte parallel link thereof;

converts the copy of the memory board-to-director board portion high byte serial link and the special thereof characters interspersed the data in the high byte serial link thereof into corresponding parallel higher significant bytes of the high byte parallel link thereof and concurrently converts the copy of the director board-to-memory board portion low byte serial link and the special characters interspersed with the data in the low byte serial link thereof into corresponding parallel lower significant bytes of the low byte parallel link thereof.

7. The interface recited in claim 6 wherein the logic determines whether the data and pattern of special characters in the converted low byte parallel link and the data and the pattern of special characters in the converted high byte parallel link for the memory board-director board portion are misaligned and whether the data and pattern of special characters in the converted low byte parallel link and the data and the pattern of special characters in the converted high byte parallel link for the director board-memory board portion are misaligned.

8. The interface recited in claim 7 wherein such system maintains a count of the number of mismatches, such system providing a reset signal when a predetermined plurality of mismatches has been indicated.

9. The interface recited in claim 8 wherein:
each one of the adapter boards has a connector with a linear array of N pins, such pins being arranged in sets of four pins, each set of four pins for the copy of signals from the director board-to-memory board portion of each one of such primary channels passing signals and the copy of signals from the a memory board-to-director board portion of each one of such primary channels passing signals to provide N/4 redundant channels, where N is an integer greater than one; and
each one of the analyzer boards has a connector with a linear array of M pins adapted for connecting to the connector of a corresponding one of the adapter board connectors, where M=N/2, such analyzer board pins being arranged in sets of four pins, each set of four pins providing a receiving channel, such adapter board pins thereby providing M/4 receiving channels, each one of the M/4 receiving channels being adapted for connection to a corresponding one of the N/4 redundant channels thereby providing connections to N/2 redundant channels and N/2 unconnected redundant channels, one of the M/4 receiving channels being connected one of the redundant channels disposed adjacent to one of the unconnected redundant channels.

* * * * *